W. L. BLISS.
AUTOMATIC ELECTRIC REGULATOR.
APPLICATION FILED JULY 1, 1907. RENEWED JULY 28, 1916.
1,197,176.
Patented Sept. 5, 1916.
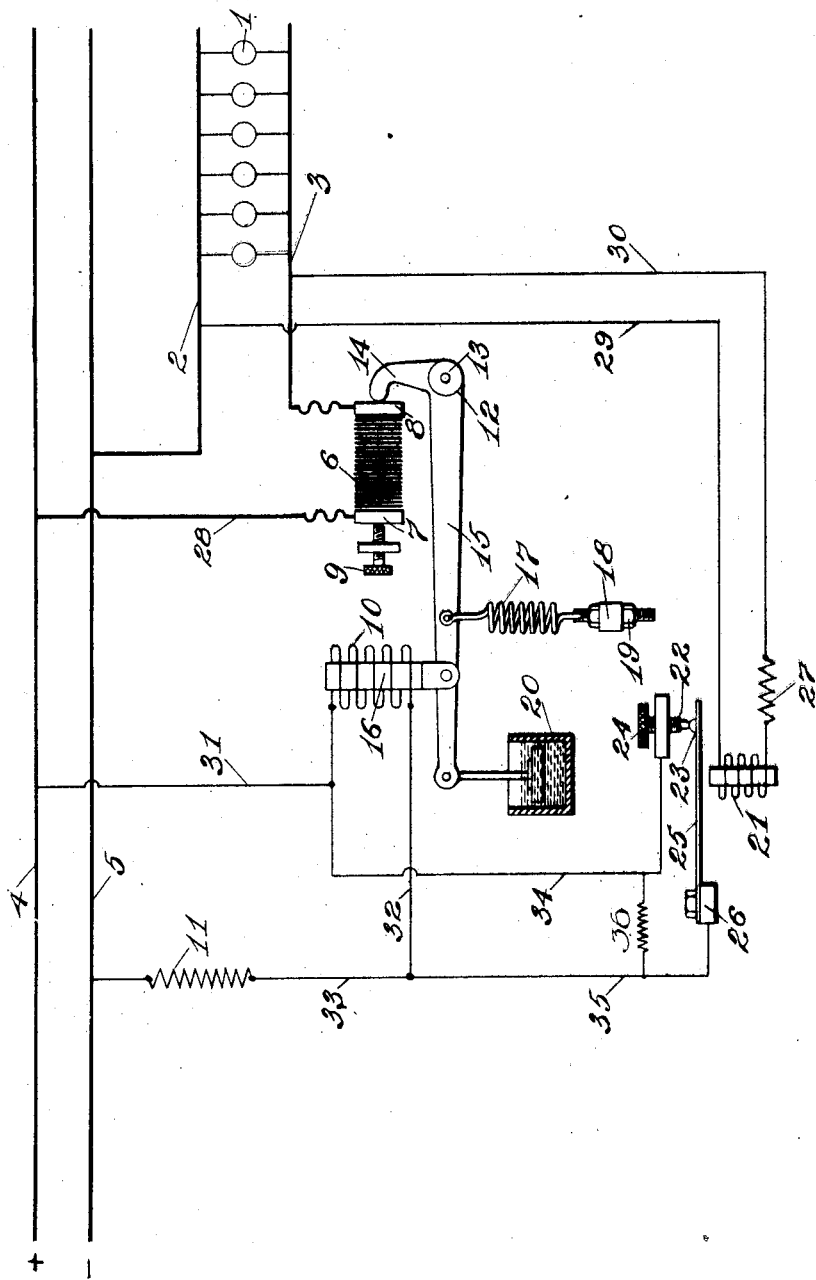

UNITED STATES PATENT OFFICE.

WILLIAM LORD BLISS, OF BROOKLYN, NEW YORK, ASSIGNOR, BY MESNE ASSIGNMENTS, TO U. S. LIGHT AND HEAT CORPORATION, OF NIAGARA FALLS, NEW YORK, A CORPORATION OF NEW YORK.

AUTOMATIC ELECTRIC REGULATOR.

1,197,176.      Specification of Letters Patent.      Patented Sept. 5, 1916.

Application filed July 1, 1907, Serial No. 381,745. Renewed July 28, 1916. Serial No. 111,956.

*To all whom it may concern:*

Be it known that I, WILLIAM LORD BLISS, a citizen of the United States, residing at Brooklyn, in the county of Kings and State of New York, have invented new and useful Improvements in Automatic Electric Regulators, of which the following is a full, clear, concise, and exact description, reference being had to the accompanying drawing, forming a part of this specification.

My invention relates to improvements in automatic regulators.

One of the objects of my invention is to provide improved means by which the potential impressed upon an electric circuit may be kept practically constant, notwithstanding fluctuations in the potential at the source of electrical energy.

According to the preferred form of my invention, I provide a variable resistance which resistance is varied by means of an electro-magnetic winding which I shall call the operating winding. The strength and accordingly the action of the operating winding is controlled by means of another electro-magnetic winding or magnet, through the agency of intermediary instrumentalities. I shall call the magnet that controls the operating winding, the controlling winding. The controlling winding is preferably connected across the circuit on which the potential is to be regulated, and accordingly the regulator serves to maintain practically constant voltage upon said circuit. The instrumentalities which are operated by the controlling winding preferably comprise separable electrodes, which are so arranged in circuit with the operating winding that the same may regulate the strength of said operating winding by making and breaking contact. One of the electrodes is preferably stationary, while the other is movable. The controlling winding causes the movable electrode to vibrate and thus make and break contact with the stationary electrode. I prefer to mount the movable electrode upon a vibratile reed, which reed is caused to vibrate by means of the controlling winding.

While my invention may be applied to various purposes, it is especially adapted for use in electric car lighting systems, in which a generator is driven from a car axle. Inasmuch as the generator is subject to variations in speed, it tends to impress a variable electro-motive force upon the circuit of the lamps. I shall call the circuit of the lamps the translating circuit. In order that my regulator may properly regulate the voltage upon the translating circuit, I arrange the variable resistance in the translating circuit and connect the controlling winding across said circuit.

In order to more particularly set forth certain characteristics of my invention, I shall describe the accompanying drawing, in which my regulator is shown as applied to the translating circuit of a car lighting system.

The lamps and other translating devices 1, are connected across the translating circuit, which comprises conductors 2 and 3. These conductors may be connected to a main circuit having conductors 4 and 5. The main circuit is connected to a suitable source of electrical energy, which I shall assume is a variable speed generator of a car lighting system. Inasmuch as the speed of the generator varies in accordance with the speed of the car, the voltage impressed upon the main circuit 4—5, is subject to variations. In order to regulate the voltage that is impressed upon the translating circuit, I place the variable resistance of my regulator in said circuit. This resistance is preferably a series of contacting electrodes 6, arranged in said translating circuit in series. These electrodes may be carbon plates, arranged between a stationary terminal block 7, and a movable terminal block 8. The position of the stationary terminal block may be adjusted by means of a screw 9. It will be understood that a variation in pressure between the electrodes will cause a variation in resistance in the translating circuit. If the pressure be increased, the resistance will be decreased, and conversely, if the pressure be decreased the resistance will be increased.

The resistance of the electrodes is controlled by means of an operating winding 10, which may be connected across the main circuit, or to any other suitable source of electrical energy. The circuit of the operating winding is provided with a resistance 11, so that the operating winding may be rendered inert by short circuiting the same without short circuiting the conductors 4 and 5, as hereinafter more fully explained.

The operating winding serves to operate a bell crank lever 12, which is fulcrumed on a pivot 13. This lever has its arm 14 engaging the movable terminal block 8, and its arm 15 connected to the plunger 16 of the operating winding. The arm 15 is normally drawn downwardly by a spring 17, one end of which is attached to said arm, and the other end to a stationary post 18, which is provided with a nut 19 by means of which the tension of the spring may be adjusted. The downward pull exerted upon the arm 15 by the spring 17, causes the arm 14 to press the movable terminal block 8 to the left, thereby placing the electrodes 6 under pressure. The spring thus serves to normally press the electrodes together with sufficient force to minimize the resistance in the translating circuit. The outer end of the arm 15 may be connected to the piston of a dash pot 20. If the strength of the operating winding 10 increases, the arm 15 will be pulled upwardly, and accordingly the pressure between the electrodes will be reduced, thereby increasing the resistance in the translating circuit.

The strength and accordingly the resulting action of the operating winding is controlled by the controlling winding 21, through the agency of a pair of separable electrodes 22 and 23. These electrodes are normally in contact, and are preferably so connected in circuit, that the same short circuit the operating winding when in contact. The electrode 22 is preferably mounted upon an adjusting screw 24, which is connected to one terminal of the winding 10. The electrode 23 is preferably mounted upon the free end of a vibratile reed 25, the other end of which is attached to a stationary block 26 which is connected to the other terminal of the operating winding. The controlling magnet or winding is arranged to cause and control the vibration of the reed 25. When the reed vibrates the electrodes 22 and 23 make and break contact in rapid succession. The controlling winding is connected across the translating circuit. The circuit of said winding may be provided with a resistance 27, preferably made of zero temperature coefficient material in order to prevent a change in temperature in the controlling winding from materially affecting the voltage at which said winding is operating.

The current which is supplied to the lamps flows from the conductor 4, through conductor 28, thence through the electrodes 6, conductor 3, lamps 1, and conductor 2, to the conductor 5. The circuit of the controlling winding 21 extends from the conductor 2, through conductor 29, winding 21, resistance 27 and conductor 30 to the conductor 3. The circuit of the operating winding 10 extends from the conductor 4, through conductor 31, winding 10, conductors 32, 33, and resistance 11, to the conductor 5. The short circuit around the operating winding 10 extends from one terminal of said winding through conductor 34, electrodes 22 and 23, reed 25, block 26, and conductors 35 and 32, to the other terminal of said winding.

I shall now describe the operation of my system. When the voltage upon the main circuit 4, 5 is just sufficient to impress the normal lamp voltage upon the translating circuit with the minimum resistance of the electrodes 6 in circuit, the controlling magnet 21 is not energized sufficiently to attract the reed 25. If the voltage upon the main circuit increases, the voltage upon the translating circuit will rise and cause the controlling winding 21 to respond, and attract the reed 25. The electrodes 22 and 23 are thus separated, thereby opening the short circuit around the operating winding 10, which winding will become energized and increase the resistance of the electrodes 6. The rise in voltage upon the translating circuit is thereby checked and caused to decrease. The reduction in voltage weakens the magnet 21 and the reed 25 springs back to its normal position. The electrodes 22 and 23 then short circuit the operating winding 10 again. Accordingly the resistance of the electrodes 6 decreases and the voltage upon the translating circuit rises again, thereby causing the previous cycle of operation of the regulator to be repeated. A resistance 36 or other means is preferably connected across the electrodes 22 and 23 to prevent excessive sparking between said electrodes. I prefer to have the electrodes 22 and 23 connected in circuit to short circuit the operating winding 10, but the same may be connected in circuit in different relations to said operating winding to perform the functions assigned thereto. Very slight variations in voltage upon the translating circuit cause the controlling winding 21 to attract and release the reed 25. In fact the reed will be attracted upon less than one per cent. increase in voltage, and will be released upon even less decrease. The operating winding responds very quickly to the opening or closing of the short circuit around the same. Each instrumentality of the regulator responds almost instantly to the conditions by which it is influenced. While the voltage upon the translating circuit tends to rise higher than the normal lamp voltage the reed vibrates very rapidly and the cycles of operation of the regulator are repeated at high frequency. Inasmuch as there is naturally a time lag in the magnetism of the operating winding 10, the fluctuations in the strength of said winding are quite small. These fluctuations are in synchronism with the vibrations of the reed, and produce corresponding fluctuations in the resistance of the electrode 6. Inasmuch as less than one per cent. fluctuation in the voltage upon the controlling magnet 21 is sufficient to vibrate the reed 25, the fluctuations in resistance are sufficient to keep the voltage upon the lamp circuit within that value. Accordingly it may be said that practically constant voltage is maintained upon the translating circuit. An increase in the voltage upon the main circuit causes a change in the character of the vibration of the reed 25, thereby raising the mean value of the fluctuations in the strength of the operating winding. In consequence there is a corresponding rise in the mean value of the fluctuations of the resistance, thereby preventing an abnormal increase in voltage upon the translating circuit.

I have herein given certain theories of electrical action that appear to underlie the cycle of operation of my regulator. As a matter of fact the frequency of vibration of the reed is higher than the frequency of visibility, and accordingly the frequency of the cycles of operation of the regulator are so high that it is difficult to determine the exact electrical action that takes place in certain of the instrumentalities of my regulator. The fact remains, however, that the organization of the elements of my regulator in the manner described causes practically constant voltage to be maintained upon the translating circuit notwithstanding the variations in voltage upon the main circuit.

While I have particularly described certain structures and assumed certain conditions in the setting forth of my invention, as exemplified in the drawing, it will be understood that my invention is susceptible of being embodied in various forms, and operating under different conditions, and that it is not limited in structure or application further than is specifically set forth in the appended claim.

Having thus described my invention, what I claim as new and desire to secure by Letters Patent, is:

An automatic voltage regulator comprising a resistance consisting of contacting electrodes, a pivoted lever engaging said electrodes, a spring actuating said lever to compress said electrodes, a solenoid connected across a circuit and having a plunger which is connected to said lever whereby said solenoid when energized causes a reduction of pressure between said electrodes in opposition to the tendency of said spring, a resistance in series with said solenoid, a shunt circuit around said solenoid, a vibratile member having one end rigidly mounted and the opposite end free to vibrate, said free end having a contact for making and breaking said shunt circuit at a rapid rate to control the mean energization of said solenoid, and a voltage responsive winding acting upon said vibratile member, said winding being connected across the circuit to be regulated.

In witness whereof, I have hereunto subscribed my name in the presence of two witnesses.

WILLIAM LORD BLISS.

Witnesses:
   FRANK H. HUBBARD,
   ALEXANDER H. LIDDERS.

Copies of this patent may be obtained for five cents each, by addressing the "Commissioner of Patents, Washington, D. C."